United States Patent [19]
Yanagisawa

[11] Patent Number: 5,508,819
[45] Date of Patent: Apr. 16, 1996

[54] DATA TRANSMITTING APPARATUS

[75] Inventor: Kazuto Yanagisawa, Yokohama, Japan

[73] Assignee: Canon Kabushiki Kaisha, Tokyo, Japan

[21] Appl. No.: 223,422

[22] Filed: Apr. 4, 1994

[30] Foreign Application Priority Data

Apr. 30, 1993 [JP] Japan ..................... 5-128054

[51] Int. Cl.⁶ .................. H04N 1/21; H04N 1/32
[52] U.S. Cl. .................. 358/404; 358/440; 358/441; 358/468
[58] Field of Search ...................... 358/404, 402, 358/403, 407, 434, 440, 435, 437, 438, 439, 468; 379/100

[56] References Cited

U.S. PATENT DOCUMENTS 4,607,289  8/1986  Kurokawa .................. 358/402
5,065,426  11/1991  Greenstein et al. .................. 379/100

*Primary Examiner*—Scott A. Rogers
*Attorney, Agent, or Firm*—Morgan & Finnegan

[57] ABSTRACT

A data communication apparatus comprises an input unit to input transmission data; a memory to store additional information to be transmitted together with the transmission data by which was input from the input unit; a prohibiting unit to prohibit the transmission of the transmission data in accordance with whether the additional information including the ID information to identify the transmission person or the like has already been stored in the memory or not; notifying units to notify that the transmission of the transmission data was prohibited by the prohibiting unit; a register to register the additional information into the memory; and a requiring unit to require to input the additional information when the transmission of the transmission data is prohibited by the prohibiting unit.

16 Claims, 1 Drawing Sheet

DATA TRANSMITTING APPARATUS

BACKGROUND OF THE INVENTION

1. Field of the Invention

The present invention relates to a data transmitting apparatus for transmitting transmission data together with additional information.

2. Related Background Art

As a conventional data communication apparatus such as a facsimile apparatus or the like, there is an apparatus which receives ID (identification) information of a transmission person at the time of call reception and refuses the reception from a person other than the transmission person who has previously been registered.

In such a communication apparatus, however, in order to receive data, there is a problem such that ID information of all of the transmission persons who have a possibility to receive data must be previously registered or when receiving a call, an operator once responds to the call reception and, after that, the operator must manually permit the reception, so that the operation is complicated.

SUMMARY OF THE INVENTION

It is an object of the present invention to prevent that data is transmitted from an unidentified person.

Another object of the invention is to provide a data transmitting apparatus having a simple communication restricting function.

Still another object of the invention is to provide a data transmitting apparatus which prohibits a data transmission when additional information is not stored.

The above and other objects of the present invention will become apparent from the following description of an embodiment.

DETAILED DESCRIPTION OF THE PREFERRED EMBODIMENT

Figure 1:
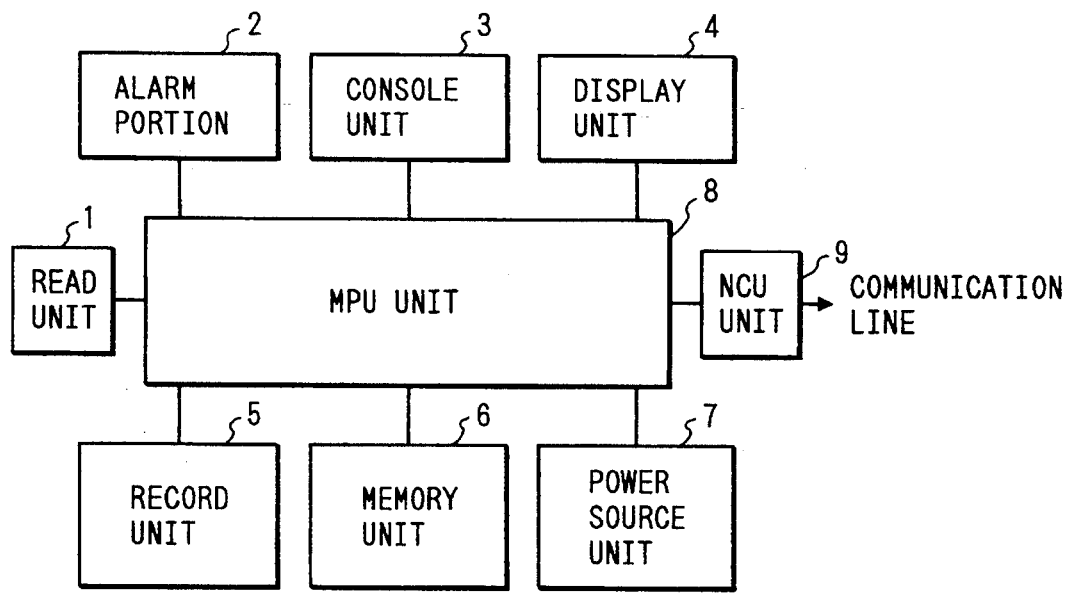
FIG. 1 is a block diagram showing an embodiment of the invention.

FIG. 1 is a block diagram showing an embodiment of the invention.

A facsimile apparatus in the embodiment comprises: a read unit 1 for reading an image on an original to be transmitted and converting into an electric signal; an alarm portion 2 for generating an alarm sound to the operator; a console unit 3 for inputting various kinds of data by using keys by the operator; a display unit 4 for performing a visible display to the operator; a record unit 5 for recording an image; a memory unit 6 for holding various kinds of data; a power source unit 7 for supplying a power source to each unit of the apparatus; an MPU unit 8 for controlling the whole apparatus; and an NCU unit 9 for performing a communication control and a network control for an image data transmission or the like.

Figure 2:
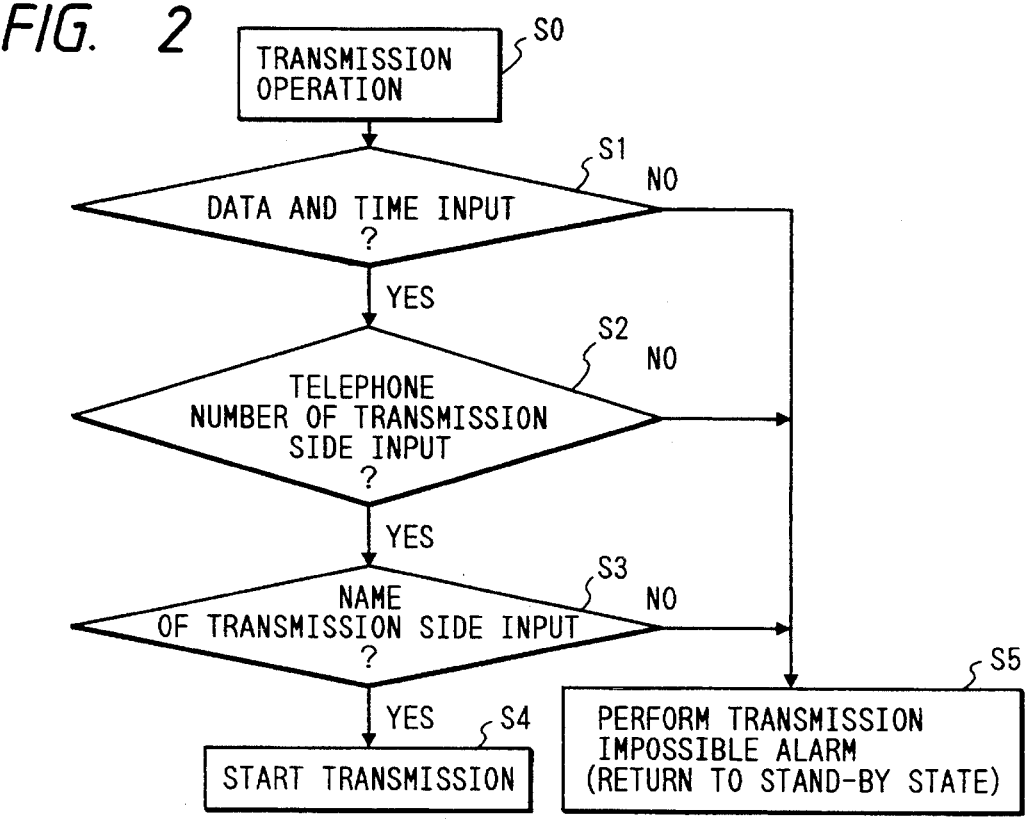
FIG. 2 is a flowchart showing the operation of the embodiment.

FIG. 2 is a flowchart showing the operation upon transmission in the embodiment.

When a key operation for transmission is performed by the console unit 3 by the operator (step S0), the MPU unit 8 discriminates whether day and time information has been input to the memory unit 6 or not (S1). If NO, the MPU unit 8 judges that the transmission cannot be executed, and a warning indicating that the transmission is impossible is performed by generating an alarm sound and displaying a message by the alarm portion 2 and the display unit 4 (S5).

On the other hand, in the case where the day and time information has been stored in the memory unit 6 in S1, the MPU unit 8 subsequently checks whether the telephone number of a transmission side has been input to the memory unit 6 or not (S2). If NO, the MPU unit 8 judges that the transmission is impossible, and a warning indicating that the transmission is impossible is performed by generating an alarm and displaying a message by the alarm portion 2 and the display unit 4 (S5).

Further, in the case where the telephone number of the transmission side has been stored in the memory unit 6 in S2, the MPU unit 8 checks whether the name of the transmission side has been input to the memory unit 6 or not (S3). If NO, the MPU unit 8 judges that the transmission is impossible, and a warning indicating that the transmission is impossible is performed by generating an alarm and displaying a message by the alarm portion 2 and the display unit 4 (S5).

In the case where the name of the transmission side has been input to the memory unit 6 in S3, the telephone number designated from the console unit 3 is dialed and the day and time information, the telephone number of the transmission side, and the name mentioned above are added as a header and the transmitting operation of the image information which was read out by the read unit 1 is started (S4).

As mentioned above, it is possible to exclude an anonymous transmission having no information of the transmission side and a prank facsimile transmission and a transmission such as a direct mail or the like can be made difficult.

According to the above embodiment, the transmission is permitted only in the case where all of day and time information, the telephone number of the transmission side, and the name are judged. It is, however, also possible to allow the transmission by judging the presence or absence of the registration of only a part of them.

Namely, when both of the telephone number and the name of the transmission side are not registered, the transmission is prohibited. In the case where either one of the telephone number and the name of the transmission side has been registered, the transmission is allowed.

The order of judging about whether each additional information has been input or not is not limited to that as shown in FIG. 2 and it is also possible to exchange the order.

According to the embodiment, although the processing routine is advanced to the warning process (S5) in the case where it is judged that each additional information is not input, the processing routine can be further advanced to the stand-by state of inputting of the additional information. In this instance, in the case where day and time information of the transmission is not input, a display by the display unit 4 or the like to promote the input from the console unit 3 is performed to the operator.

When the additional information is input from the console unit 3, it is registered to the memory unit 6.

In the above embodiment, although each additional information has been added to the transmission image as characters of a header, it is also possible to construct in a manner such that the additional information is transmitted to an apparatus of a partner side by using some other control procedure (CSI, TSI, NSF, NSS, or the like) and is further notified to the operator of the partner side by using some display (for example, LCD).

It is also possible to execute either one of the memory transmission such that, after all of the image data which was read out from the read unit 1 was once stored into the memory unit 6, the transmitting operation is started and the direct transmission such that the transmitting operation is started before reading out the data from the read unit 1.

As mentioned above, in the embodiment, since the function for prohibiting the transmission in the case where various kinds of additional information such as information of the transmission side and the like is not input when performing the facsimile transmission is provided, it is possible to eliminate an illegal anonymous transmission from an unidentified person.

The present invention is not limited to the apparatus for transmitting image data such as G3 and G4 facsimile apparatuses and the like but can be also applied to an apparatus which can transmit character code data. The invention is not limited to the above embodiment but many modifications and variations are possible within the spirit and scope of the appended claims of the invention.

What is claimed is:

1. A data communication apparatus comprising:

input means for inputting data to be transmitted;

setting means for setting additional information to be added to the transmission data, the additional information including identification information for identifying a transmission party of the transmission data;

memory means for storing the additional information set by said setting means;

transmitting means for transmitting the additional information stored in said memory means and the transmission data to a destination;

display means for requiring to input the additional information: and control means for determining whether or not the additional information has been stored in said memory means, before transmitting the transmission data, and for controlling a transmission operation by said transmitting means and said display means in accordance with the determination, wherein said control means causes said transmitting means to transmit the additional information and the transmission data when the additional information has been stored in said memory means, and stops the transmission operation and causes said display means to display an alarm to require to input the additional information when the additional information has not been stored in said memory means.

2. An apparatus according to claim 1, wherein said transmission data is image data and said additional information is characters which are added to the image data.

3. An apparatus according to claim 1, wherein said transmission data is image data and said additional information is transmitted in a procedure signal.

4. A data communication apparatus comprising:

input means (1) for inputting transmission data;

memory means (6) for storing additional information to be transmitted together with the transmission data input by said input means;

characterized by further comprising:

prohibiting means (8) for prohibiting a transmission of the transmission data in accordance with whether or not the additional information has already been stored in said memory means; and requiring means (4) for requiring to input the additional information when the transmission of the transmission data is prohibited by said prohibiting means.

5. An apparatus according to claim 4, wherein the additional information includes identification information for identifying a transmission person.

6. An apparatus according to claim 4, further comprising:

registering means (3) for registering the additional information into said memory means.

7. An apparatus according to claim 4, wherein the transmission data is image data and the additional information is characters which are added to the image data.

8. An apparatus according to claim 4, wherein the transmission data is image data and the additional information is transmitted in a procedure signal.

9. A method for data communication comprising:

inputting transmission data to be transmitted;

setting additional information to be added to the transmission data, the additional information including identification information for identifying a transmission party of the transmission data;

storing the additional information in a memory;

determining whether or not the additional information has been stored before transmitting the transmission data; and controlling a transmission operation in accordance with said determination, wherein the additional information and the transmission data is transmitted to a destination when the additional information has been stored in the memory, and the additional information and the transmission data is not transmitted to the destination when the additional information has not been stored in the memory, displaying an alarm to require to input the additional information when the additional information and the transmission data is not transmitted.

10. The method according to claim 9, wherein the transmission data is image data and the additional information is characters which are added to the image data.

11. The method according to claim 9, wherein the transmission data is image data and the additional information is transmitted in a procedure signal.

12. A method for data communication comprising:

inputting transmission data;

storing additional information to be transmitted together with the transmission data to a memory;

prohibiting a transmission of the transmission data in accordance with whether or not the additional information has already been stored in the memory; and requiring input of the additional information when the transmission of the transmission data is prohibited.

13. The method according to claim 12, wherein the additional information includes identification information for identifying a transmission person.

14. The method according to claim 12, further comprising: registering the additional information into the memory.

15. The method according to claim 12, wherein the transmission data is image data and the additional information is characters which are added to the image data.

16. The method according to claim 12, wherein the transmission data is image data and the additional information is transmitted in a procedure signal.

* * * * *